US011222373B2

(12) United States Patent
Chelly

(10) Patent No.: US 11,222,373 B2
(45) Date of Patent: *Jan. 11, 2022

(54) TEXT TRANSLATION USING CONTEXTUAL INFORMATION RELATED TO TEXT OBJECTS IN TRANSLATED LANGUAGE

(71) Applicant: eBay Inc., San Jose, CA (US)

(72) Inventor: Yan Chelly, Raanana (IL)

(73) Assignee: eBay Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/580,169

(22) Filed: Sep. 24, 2019

(65) Prior Publication Data
US 2020/0082453 A1 Mar. 12, 2020

Related U.S. Application Data

(63) Continuation of application No. 15/712,800, filed on Sep. 22, 2017, now Pat. No. 10,453,108, which is a (Continued)

(51) Int. Cl.
G06F 16/33 (2019.01)
G06F 40/58 (2020.01)
(Continued)

(52) U.S. Cl.
CPC ....... G06Q 30/0623 (2013.01); G06F 16/334 (2019.01); G06F 16/3344 (2019.01); (Continued)

(58) Field of Classification Search
CPC ................. G10L 15/18; G10L 15/1915; G06F 17/30427; G06F 17/21; G06F 17/28
(Continued)

(56) References Cited

U.S. PATENT DOCUMENTS 9,092,928 B2* 7/2015 Cohen .................. G07F 17/26
9,424,597 B2* 8/2016 Chelly ................ G06F 17/289
(Continued)

FOREIGN PATENT DOCUMENTS

AU 2014348916 A1 9/2016
AU 2016225844 A1 9/2016
(Continued)

OTHER PUBLICATIONS

Final Office action received for U.S. Appl. No. 15/712,800, dated Mar. 22, 2019, 14 pages.

(Continued)

Primary Examiner — Michael N Opsasnick
(74) Attorney, Agent, or Firm — Holland & Hart LLP

(57) ABSTRACT

In an example embodiment, text is received at an ecommerce service from a first user, the text in a first language and pertaining to a first listing on the ecommerce service. Contextual information about the first listing may be retrieved. The text may be translated to a second language. Then, a plurality of text objects, in the second language, similar to the translated text may be located in a database, each of the text objects corresponding to a listing. Then, the plurality of text objects similar to the translated text may be ranked based on a comparison of the contextual information about the first listing and contextual information stored in the database for the listings corresponding to the plurality of text objects similar to the translated text. At least one of the ranked plurality of text objects may then be translated to the first language.

20 Claims, 6 Drawing Sheets

Related U.S. Application Data continuation of application No. 15/171,476, filed on Jun. 2, 2016, now Pat. No. 9,779,439, which is a continuation of application No. 14/079,419, filed on Nov. 13, 2013, now Pat. No. 9,424,597.

(51) Int. Cl.
  *G06Q 30/06* (2012.01)
  *G10L 15/18* (2013.01)
  *G06F 40/205* (2020.01)

(52) U.S. Cl.
  CPC ............ *G06F 40/205* (2020.01); *G06F 40/58* (2020.01); *G06Q 30/0601* (2013.01)

(58) Field of Classification Search
  USPC .......................................... 704/2, 270, 277
  See application file for complete search history.

(56) References Cited

U.S. PATENT DOCUMENTS

| | | | | |
|---|---|---|---|---|
| 9,779,439 | B2* | 10/2017 | Chelly | G06F 17/289 |
| 10,453,108 | B2 | 10/2019 | Raanana | |
| 2001/0029455 | A1* | 10/2001 | Chin | G06F 17/273 704/277 |
| 2002/0134319 | A1 | 9/2002 | Frink | |
| 2002/0165817 | A1* | 11/2002 | Rackson | G06Q 40/10 705/37 |
| 2003/0120560 | A1 | 6/2003 | Almeida | |
| 2003/0144912 | A1 | 7/2003 | Mcgee | |
| 2004/0015408 | A1* | 1/2004 | Rauen, IV | G06Q 10/10 705/26.41 |
| 2004/0064305 | A1 | 4/2004 | Sakai | |
| 2004/0117451 | A1* | 6/2004 | Chung | H04L 29/06 709/207 |
| 2005/0289168 | A1* | 12/2005 | Green | G06F 17/3064 |
| 2007/0288853 | A1* | 12/2007 | Neil | G06F 9/454 715/760 |
| 2008/0097741 | A1* | 4/2008 | Bagnato | G06F 17/289 704/2 |
| 2009/0187425 | A1* | 7/2009 | Thompson | G06N 5/04 705/3 |
| 2010/0121630 | A1* | 5/2010 | Mende | G06F 40/30 704/7 |
| 2010/0145673 | A1 | 6/2010 | Cancedda | |
| 2011/0197208 | A1 | 8/2011 | Hofer et al. | |
| 2012/0240039 | A1* | 9/2012 | Walker | G06Q 10/10 715/265 |
| 2013/0073473 | A1* | 3/2013 | Heath | G06Q 30/02 705/319 |
| 2013/0111364 | A1 | 5/2013 | Boone | |
| 2014/0344718 | A1* | 11/2014 | Rapaport | H04L 51/32 715/753 |
| 2014/0350913 | A1* | 11/2014 | Cheng | G06F 40/20 704/2 |
| 2015/0081271 | A1* | 3/2015 | Sumita | G10L 15/00 704/2 |
| 2015/0127320 | A1* | 5/2015 | Seo | G06F 40/247 704/2 |
| 2015/0134319 | A1* | 5/2015 | Chelly | G06Q 30/0601 704/2 |
| 2016/0275587 | A1 | 9/2016 | Chelly | |
| 2018/0012278 | A1 | 1/2018 | Chelly | |
| 2018/0018331 | A1 | 1/2018 | Kesamreddy | |

FOREIGN PATENT DOCUMENTS

| | | | |
|---|---|---|---|
| CA | 2929836 | C | 2/2017 |
| EP | 2633485 | A2 | 9/2013 |
| KR | 101713105 | B1 | 3/2017 |
| WO | 2013/134284 | A1 | 9/2013 |
| WO | 2015/073318 | A1 | 5/2015 |

OTHER PUBLICATIONS

Non-Final Office Action received for U.S. Appl. No. 15/712,800, dated Sep. 21, 2018, 14 pages.
Notice Of Allowance received for U.S. Appl. No. 15/712,800, dated Jun. 10, 2019, 5 pages.
Preliminary Amendment for U.S. Appl. No. 15/712,800, filed Oct. 9, 2017, 7 pages.
Response to Final Office Action filed on May 22, 2019 for U.S. Appl. No. 15/712,800, dated Mar. 22, 2019, 7 pages.
Response to Non-Final Office Action filed on Dec. 20, 2018, for U.S. Appl. No. 15/712,800, dated Sep. 21, 2018, 10 pages.
First Action Interview—Pre -Interview Communication received for U.S. Appl. No. 15/171,476, dated Aug. 8, 2016, 5 pages.
First Action Interview—Office Action Summary received for U.S. Appl. No. 15/171,476, dated Jan. 5, 2017, 3 pages.
Notice of Allowance received for Australian Patent Application No. 2014348916, dated Jun. 6, 2016, 2 pages.
First Examination Report received for Australian Patent Application No. 2016225844, dated Apr. 28, 2017, 4 pages.
International Preliminary Report on Patentability received for PCT Application No. PCT/US2014/064568, dated May 26, 2016, 6 pages.
International Search Report received for PCT Application No. PCT/US2014/064568, dated Feb. 6, 2015, 2 pages.
International Written Opinion received for PCT Application No. PCT/US2014/064568, dated Feb. 6, 2015, 4 pages.
Non-Final Office Action received for U.S. Appl. No. 14/079,419, dated Oct. 23, 2015, 10 pages.
Notice of Allowability received for U.S. Appl. No. 14/079,419, dated Jul. 19, 2016, 2 pages.
Notice of Allowability received for U.S. Appl. No. 14/079,419, dated Jun. 23, 2016, 2 pages.
Notice of Allowability received for U.S. Appl. No. 15/171,476, dated Jun. 23, 2017, 2 pages.
Notice of Allowance received for U.S. Appl. No. 14/079,419, dated Feb. 23, 2016, 6 pages.
Notice of Allowance received for U.S. Appl. No. 15/171,476, dated Jun. 1, 2017, 6 pages.
Notice of Non-Compliant Amendment received for U.S. Appl. No. 15/171,476, dated Dec. 13, 2016, 3 pages.
Office Action received for Canadian Patent Application No. 2,929,836, dated May 30, 2016, 3 pages.
Office Action received for Korean Patent Application No. 2016-7015528, dated Jul. 14, 2016, 5 pages (3 pages of Official Copy and 2 pages of English Pending Claims).
Office Action received for Korean Patent Application No. 2017-7005730, dated Jul. 17, 2017, 8 pages (3 pages of Official Copy and 5 pages of English Pending Claims).
Preliminary Amendment for U.S. Appl. No. 15/171,476, filed Jun. 8, 2016, 7 pages.
Response to First Examination Report filed on Aug. 23, 2017, for Australian Patent Application No. 2016225844, dated Apr. 28, 2017, 21 pages.
Response to Non-Compliant Amendment filed on Feb. 13, 2017, for U.S. Appl. No. 15/171,476, dated Dec. 13, 2016, 3 pages.
Response to Non-Final Office Action filed on Feb. 10, 2016, for U.S. Appl. No. 14/079,419, dated Oct. 23, 2015, 12 pages.
Response to Office Action filed on Jul. 14, 2016, for Canadian Patent Application No. 2,929,836, dated May 30, 2016, 7 pages.
Response to Office Action filed on Sep. 9, 2016, for Korean Patent Application No. 2016-7015528, dated Jul. 14, 2016, 13 pages (4 pages of Official Copy and 9 pages of English Pending Claims).
Response to Office Action filed on Sep. 18, 2017, for Korean Patent Application No. 2017-7005730, dated Jul. 17, 2017, 11 pages (4 pages of Official Copy and 7 pages of English Pending Claims).
Supplemental Preliminary Amendment for U.S. Appl. No. 15/171,476, filed Oct. 11, 2016, 6 pages.
Notice of Allowance received for Korean Patent Application No. 10-2016-7015528, dated Nov. 29, 2016, 3 pages (1 page of English Translation and 2 pages of Official Copy).
Notice of Allowance received for Korean Patent Application No. 10-2017-7005730, dated Jan. 31, 2018, 3 pages (1 page of English

(56) References Cited

OTHER PUBLICATIONS

Translation and 2 pages of Official Copy).
Notice of Allowance received for Korean Patent Application No. 10-2018-7011612, dated May 19, 2018, 3 pages (1 page of English Translation and 2 pages of Official Copy).
Examiner Interview Summary received for U.S. Appl. No. 14/079,419, dated Jan. 29, 2016, 3 pages.
U.S. Appl. No. 14/079,419, filed Nov. 13, 2013, Issued.
U.S. Appl. No. 15/171,476, filed Jun. 2, 2016, Issued.
U.S. Appl. No. 15/712,800, filed Sep. 22, 2017, Issued.

* cited by examiner

TEXT TRANSLATION USING CONTEXTUAL INFORMATION RELATED TO TEXT OBJECTS IN TRANSLATED LANGUAGE

PRIORITY

This application is a continuation of and claims the benefit of priority to U.S. patent application Ser. No. 15/712,800, filed Sep. 22, 2017, which is a continuation of and claims the benefit of priority to U.S. patent application Ser. No. 15/171,476, filed on Jun. 2, 2016, which is a continuation of and claims the benefit of priority to U.S. patent application Ser. No. 14/079,419, filed on Nov. 13, 2013, now U.S. Pat. No. 9,424,597, each of which are hereby incorporated by reference herein in their entireties.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013, All Rights Reserved.

TECHNICAL FIELD

The present application relates generally to electronic commerce and, in one specific example, to techniques for translating text for ecommerce transactions.

BACKGROUND

The use of mobile devices, such as cellphones, smartphones, tablets, and laptop computers, has increased rapidly in recent years, which, along with the rise in dominance of the Internet as the primary mechanism for communication, has caused an explosion in electronic commerce ("ecommerce"). As these factors spread throughout the world, communications between users that utilize different spoken or written languages increase exponentially. Ecommerce has unique challenges when dealing with differing languages being used, specifically an ecommerce transaction often involves the need to ensure specific information is accurate. For example, if a potential buyer asks a seller about some aspect of a product for sale, the answer should be precise and accurate. Any failing in the accuracy of the answer could result in a lost sale or an unhappy purchaser.

BRIEF DESCRIPTION OF THE DRAWINGS

Some embodiments are illustrated by way of example and not limitation in the figures of the accompanying drawings in which.

DETAILED DESCRIPTION

Example methods and systems for text translation in ecommerce services are provided. It will be evident, however, to one skilled in the art that the present inventive subject matter may be practiced without these specific details.

According to various exemplary embodiments, context information about past purchases, communications, or other known information surrounding parties to a potential ecommerce transaction are used to improve translation of text related to the potential ecommerce transaction.

Figure 1:
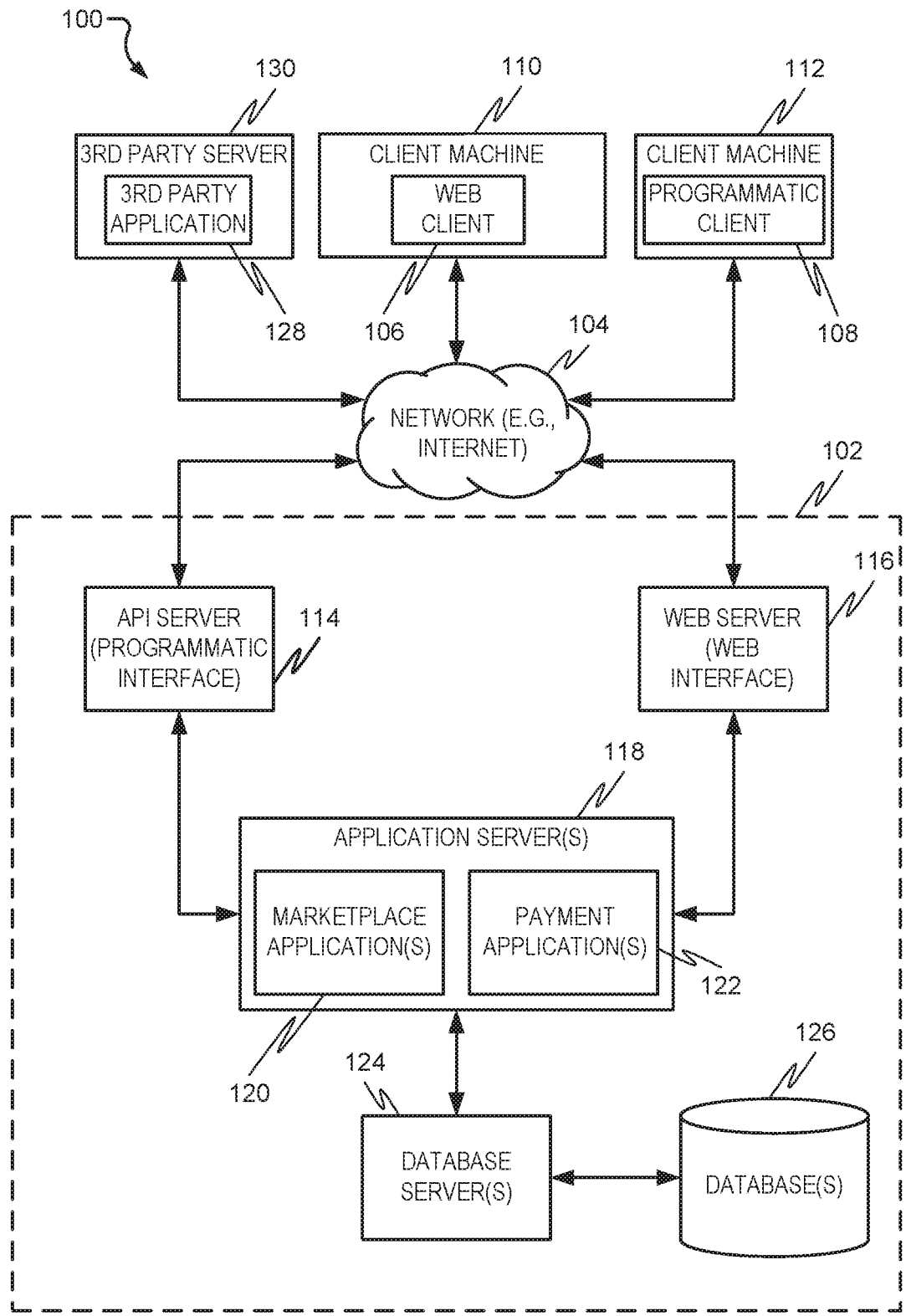
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)), to one or more clients. FIG. 1 illustrates, for example, a web client 106 (e.g., a browser, such as the Internet Explorer browser developed by Microsoft Corporation of Redmond, Wash. State) and a programmatic client 108 executing on respective devices 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
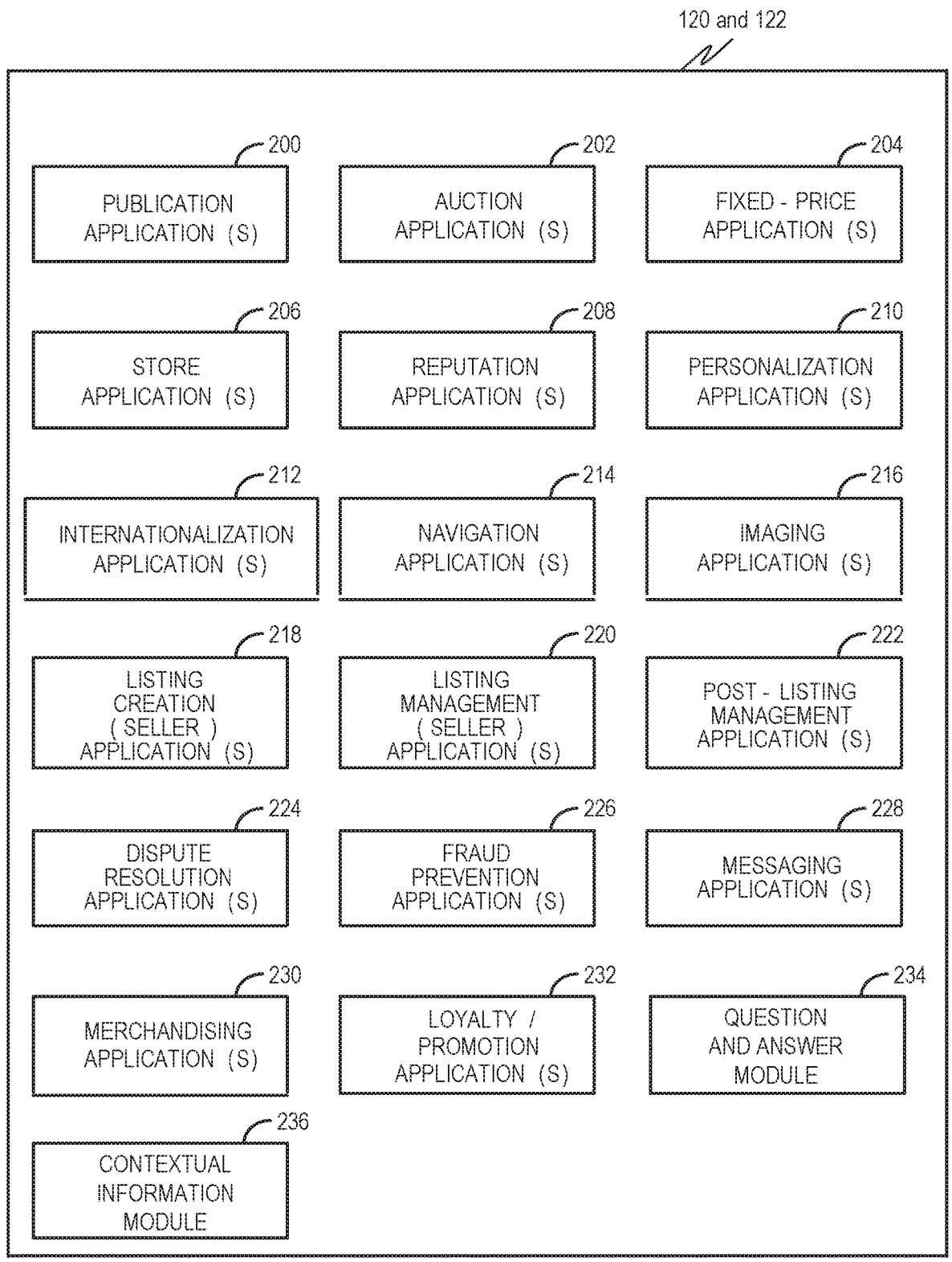
FIG. 2 is a block diagram illustrating marketplace and payment applications and that, in one example embodiment, are provided as part of application server(s) in the networked system.

FIG. 2 is a block diagram illustrating marketplace and payment applications 120 and 122 that, in one example embodiment, are provided as part of application server(s) 118 in the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-it-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information by the networked system 102) according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular WiFi, WiMAX) networks 104.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

A question and answer module 234 may allow potential buyers to submit questions to sellers, and provide a mechanism for sellers to respond to those questions.

A contextual information module 236 may gather contextual information about one or more product listings as well as sellers and potential buyers. This information may be gathered from, for example, the publication application(s) 200, auction application(s) 202, fixed-price application(s) 204, store application(s) 206, reputation application(s) 208, personalization application(s) 210, internationalization application(s) 212, navigation application(s) 214, imaging application(s) 216, listing creation application(s) 218, post-listing management application(s) 220, dispute resolution application(s) 224, fraud prevention application(s) 226, messaging application(s) 228, merchandising application(s) 230, loyalty/promotion application(s) 232, and question and answer module 234.

As described briefly earlier, in an example embodiment, context information known to an ecommerce system is used to improve the accuracy of machine translation of text related to an ecommerce listing.

Context information may be any information know to the ecommerce system that relates to an ecommerce listing. This may include, for example, information about the listing itself, such as product information, previous purchases of the same or similar items, item location, etc., as well as information about one or more of the parties involved with or that may be involved with the ecommerce listing, such as the seller and potential buyers, such as profile information and information about past purchases and questions.

An ecommerce listing may be any offer for sale of a product or service on an ecommerce web site or through an ecommerce service. This may include, for example, an auction listing, or a "buy it now" listing, but also could include a more traditional product sale page such as a web page devoted to a product sold by a particular retailer through the retailer's web page or service.

As an example, a buyer from Germany may wish to ask a question of a U.S. seller. The buyer may ask his question in German, and the system may use a machine translator to obtain an initial draft translation. Then, the system may take the translation and run an algorithm of text similarity to match the translated question to question(s) from other buyers (of this particular product/service or to other products/services). Once a match has been found with a high degree of confidence, the system may take a group of 3 to 5 similar questions (in English) and translate them back to German using the same machine translator. These similar questions could then be presented to the buyer, who may select the question at most closely fits his or her intent.

As another example, a German seller may list an item for sale using a German description. The system may use a machine translator to obtain an initial draft translation of the description into English. Then, the system may take the translation and run an algorithm of text similarity to match the translated text to other listings (past and/or present). In addition to past descriptions, other contextual information, such as past items having one or more of the same images, titles, or other aspects may be used to identify items (and thus corresponding description) that is relevant to the translation of the presently listed item. Again, the top choices may be presented to the seller, who may select the description that most closely fits his or her intent.

In an example embodiment, the feedback mechanism where the buyer and/or seller are presented with multiple possible choices to select from, may itself be used as a feeder of contextual information for future translations. For example, if a German buyer selects a particular phrase as most likely to match his or her question, then that information may be used in subsequent translations and the selected phrase may be more likely to be ranked higher when determining rankings of possible phrases to present to subsequent buyers.

Figure 3:
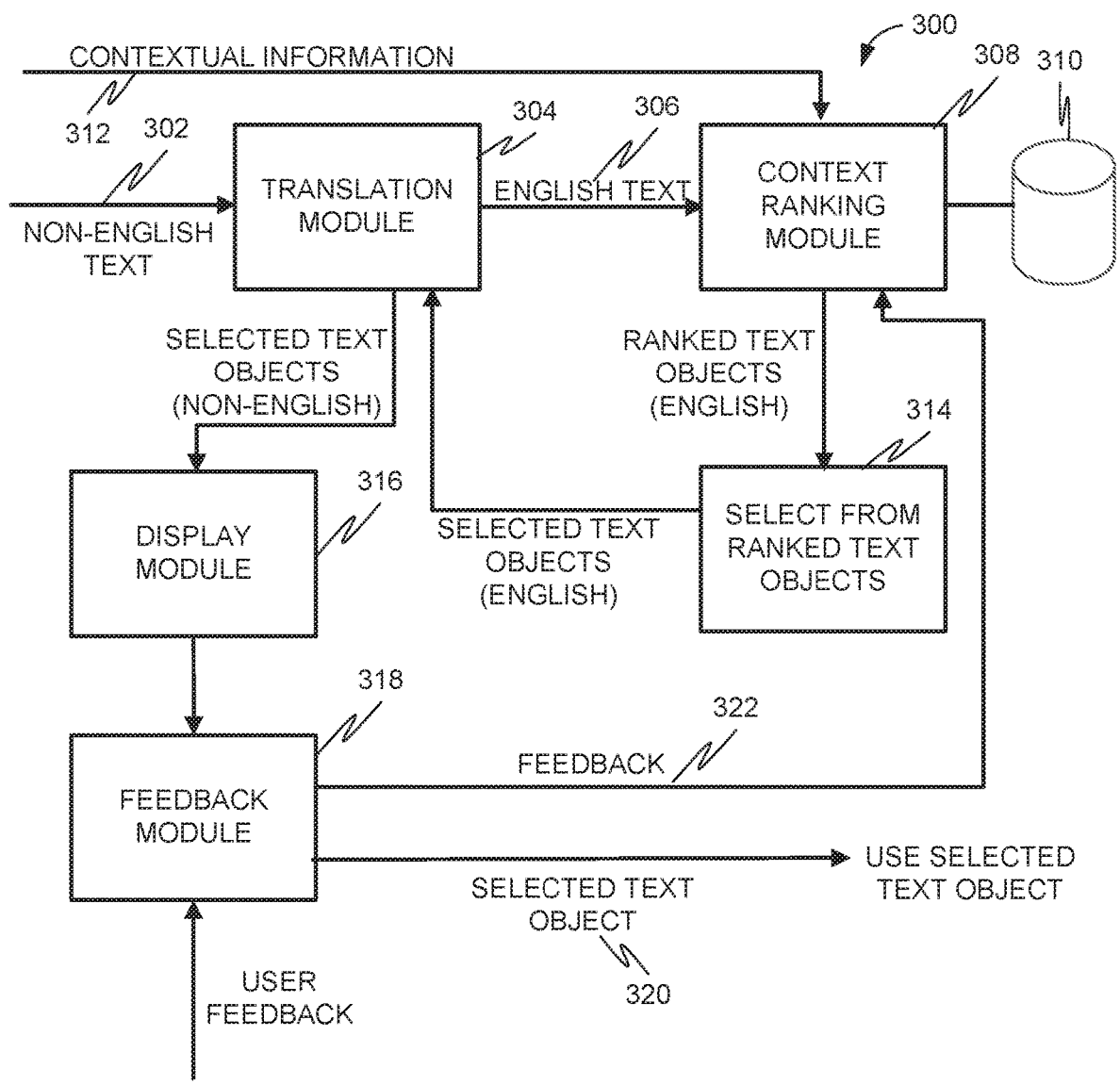
FIG. 3 is a block diagram illustrating a method of using language translation for ecommerce listings in accordance with an example embodiment.

FIG. 3 is a block diagram illustrating a method 300 of using language translation for ecommerce listings in accordance with an example embodiment. The method 300 depicts how non-English text 302 may be input to a translation module 304. The translation module 304 may be, in an example embodiment, an API to a web-based translator, although in some example embodiments a stand-alone translation module 304 may be used. The translation module 304 may act to translate the non-English text 302 to English. This may be referred to as a first pass at the translation, although this term is not intended to be limiting as the functionality of the translation module 304 itself may perform multiple passes of translation before outputting the "first pass" of the English version 306.

The English version 306 may then be passed to a context ranking module 308. The context ranking module 308 may access a database 310 of contextual information. In an example embodiment, the database 310 may include a plurality of previous item listings and/or questions posed to an e-commerce service. The database 310 may contain further contextual information, such as past purchase information, that may be helpful in producing an accurate translation. The context ranking module 308 may utilize the information in the database 310 to rank possible matching text objects. A text object is any portion of text in the database 310. In some examples it may be, for example, a question posed to a seller, an answer provided by a seller, a description in an item listing. While in some embodiments the context ranking module 308 may perform keyword searches in the database 310 looking for text objects exactly matching the English version 306 of the input, in other example embodiments other contextual information from the database 310 is used to allow for ranking of text objects that do not exactly match the English version 306. This may be combined with contextual information 312 relating to the item input. For example, a question stating "what is the range of this device?" may be posed in German to a seller whose listing is for a wireless router. In such an example, the database 310 may have a number of text objects matching this text exactly, but having to do with other types of products (such as walkie talkies, firearms, vehicles, etc.) and the database 310 may have a certain number of text objects that do not match this text exactly (e.g., "what is the range of this router?," "how far can this device transmit?") but that have to do with this exact type of product (router), judged by, for example, finding item descriptions that match the current item's description, or item images that match the current item's image. In such a case, the context ranking module 308 may actually rank the text objects of matching products higher than text objects with closer matches of text.

After the ranking, a number of the ranked text objects may be selected at operation 314. In an example embodiment, a preset number of ranked text objects are selected (e.g., the top 3 text objects). In another example embodiment, a numerical ranking is assigned to each text object and objects meeting a particular threshold may be selected (e.g., all text objects with scores above 90). In another example embodiment, the number of ranked text objects to be selected is dynamically determined based on a number of factors.

The translation module 304 is then used to translate the selected text objects back into the original non-English language of the input non-English text 302. A display module 316 then displays the translated selected text objects.

A feedback module 318 then may receive feedback from the user on the displayed text objects. In an example embodiment, this feedback may include the user selecting one of the displayed text objects as being representative of his or her initial query or listing attempt. For example, the user may select the text object that is closest to his original German question of "what is the range of this device?" as he meant the question to be interpreted. If the user was a seller writing a portion of an item description, the user may be selecting from similar portions of item descriptions that are closest to his original portion as he meant it to be interpreted. In other example embodiments, other types of feedback may be used in lieu of or in addition to direct selection of one of the displayed text objects. For example, the user may provide a thumbs up or thumbs down to various text object, or provide numeric ratings.

At the end of the feedback process, however, the result may be that one of the displayed text objects is selected (operation 320) for use in the ecommerce service. The use may match the user's initial attempted use of the input non-English text 302. For example, if the user was initially attempting to submit a question to a seller, the newly selected text object from the displayed text object may be submitted to the seller.

Feedback 322 may also be passed back to the context ranking module 308 and used by the context ranking module 308 in further rankings of text objects. In this way, the context ranking module 308 acts as a learning system, able to adapt to feedback on its performance. For example, if the user selects a third ranked text object of the top 3 text objects displayed, then the context ranking module 308 may adjust weights to its algorithm based on this feedback 322, or make other adjustments, to attempt to improve the ranking in the future. Likewise, if the user selects the first ranked text object of the top 3 text objects displayed, then the context ranking module 308 may leave its algorithm as-is as it apparently is functioning properly.

Figure 4:
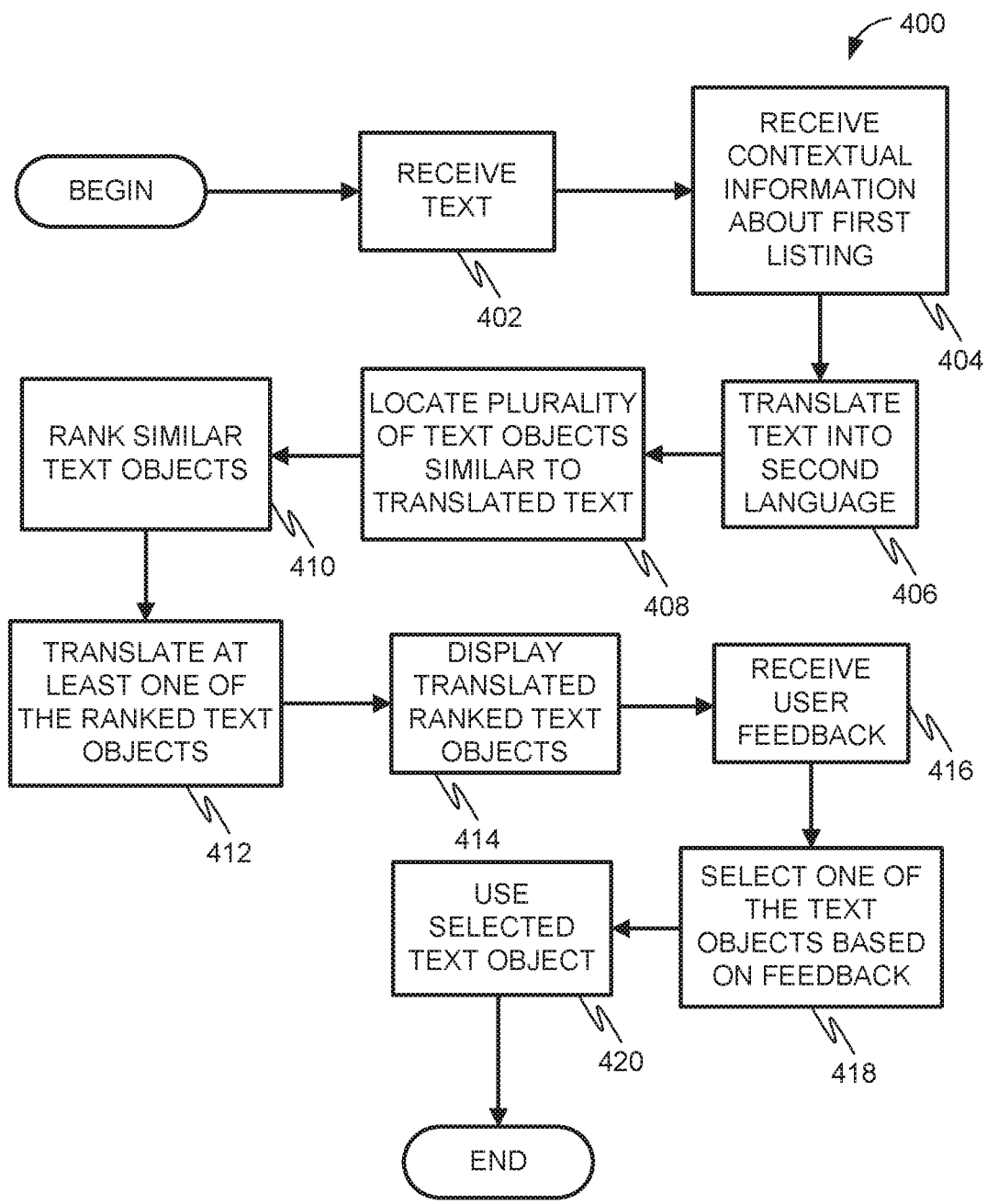
FIG. 4 is a flowchart illustrating an example method, consistent with various embodiments described above.

FIG. 4 is a flowchart illustrating an example method 400, consistent with various embodiments described above. At operation 402, text from a first user is received at an ecommerce service. The text may be in a first language and pertain to a first listing on the ecommerce service. At operation 404, contextual information about the first listing may be received. This may include, for example, information about the first listing such as item title, description, image(s), etc. At operation 406, the text may be translated to a second language. At operation 408, a plurality of text objects, in the second language, similar to the translated text, may be located in a database. Each of the text objects may correspond to a listing.

At operation 410, the plurality of text objects similar to the translated text may be ranked based on a comparison of the contextual information about the first listing and contextual information stored in the database for the listings corresponding to the plurality of text objects similar to the translated text. At operation 412, at least one of the ranked plurality of text objects may be translated to the first language.

At operation 414, the translated at least one of the ranked plurality of text objects may be displayed to the first user. This may include sending the appropriate text objects to a user device for display. At operation 416, feedback may be received from the first user. At operation 418, one of the subset of the ranked plurality of text objects may be selected based on the feedback. At operation 420, the selected text object may be used in the ecommerce service.

Example Mobile Device

Figure 5:
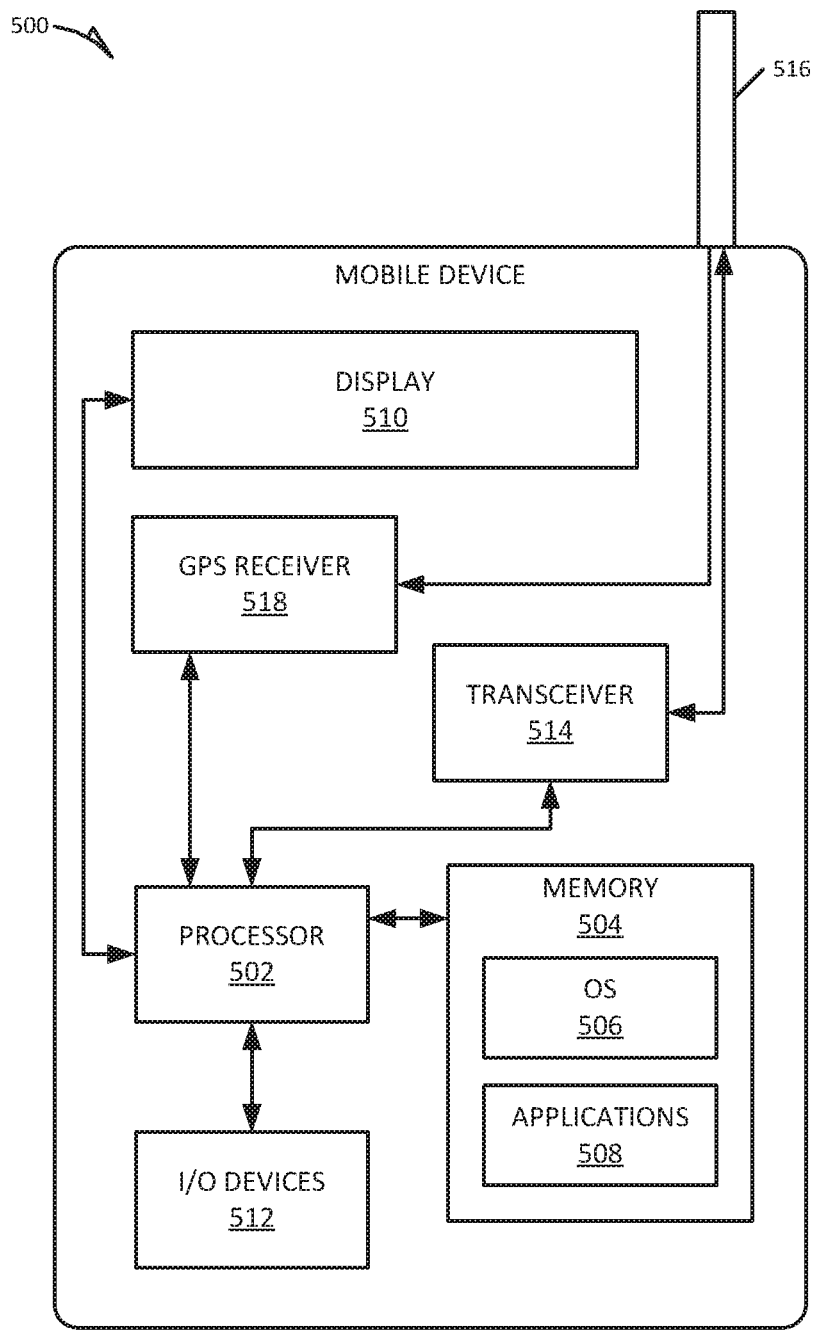
FIG. 5 is a block diagram illustrating a mobile device, according to an example embodiment.

FIG. 5 is a block diagram illustrating a mobile device 500, according to an example embodiment. The mobile device 500 may include a processor 502. The processor 502 may be any of a variety of different types of commercially, available processors suitable for mobile devices (for example, an XScale architecture microprocessor, a microprocessor without interlocked pipeline stages (NIPS) architecture processor, or another type of processor 502). A memory 504, such as a random access memory (RAM), a flash memory, or other type of memory, is typically accessible to the processor 502. The memory 504 may be adapted to store an operating system (OS) 506, as well as application programs 508, such as a mobile location enabled application that may provide LBSs to a user. The processor 502 may be coupled, either directly or via appropriate intermediary hardware, to a display 510 and to one or more input/output (I/O) devices 512, such as a keypad, a touch panel sensor, a microphone, and the like. Similarly, in some embodiments, the processor 502 may be coupled to a transceiver 514 that interfaces with an antenna 516. The transceiver 514 may be configured to both transmit and receive cellular network signals, wireless data signals, or other types of signals via the antenna 516, depending on the nature of the mobile device 500. Further, in some configurations, a GPS receiver 518 may also make use of the antenna 516 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 502 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily, configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure processor 502, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 502 that are temporarily configured (e.g., by software) or permanently configured to perform the relevant operations. Whether temporarily or permanently configured, such processors 502 may constitute processor-implemented modules that operate to perform one or more operations or functions. The modules referred to herein may, in some example embodiments, comprise processor-implemented modules.

Similarly, the methods described herein may be at least partially, processor-implemented. For example, at least some of the operations of a method may be performed by one or more processors 502 or processor-implemented modules. The performance of certain of the operations may be distributed among the one or more processors 502, not only residing within a single machine, but deployed across a number of machines. In some example embodiments, the processor 502 or processors 502 may be located in a single location (e.g., within a home environment, an office environment or as a server farm), while in other embodiments the processors 502 may be distributed across a number of locations.

The one or more processors 502 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 502, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 502 executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 502), or a combination of permanently and temporarily configured hardware may be a design choice. Below are set out hardware (e.g., machine) and software architectures that may be deployed, in various example embodiments.

Example Machine Architecture and Machine-Readable Medium

Figure 6:
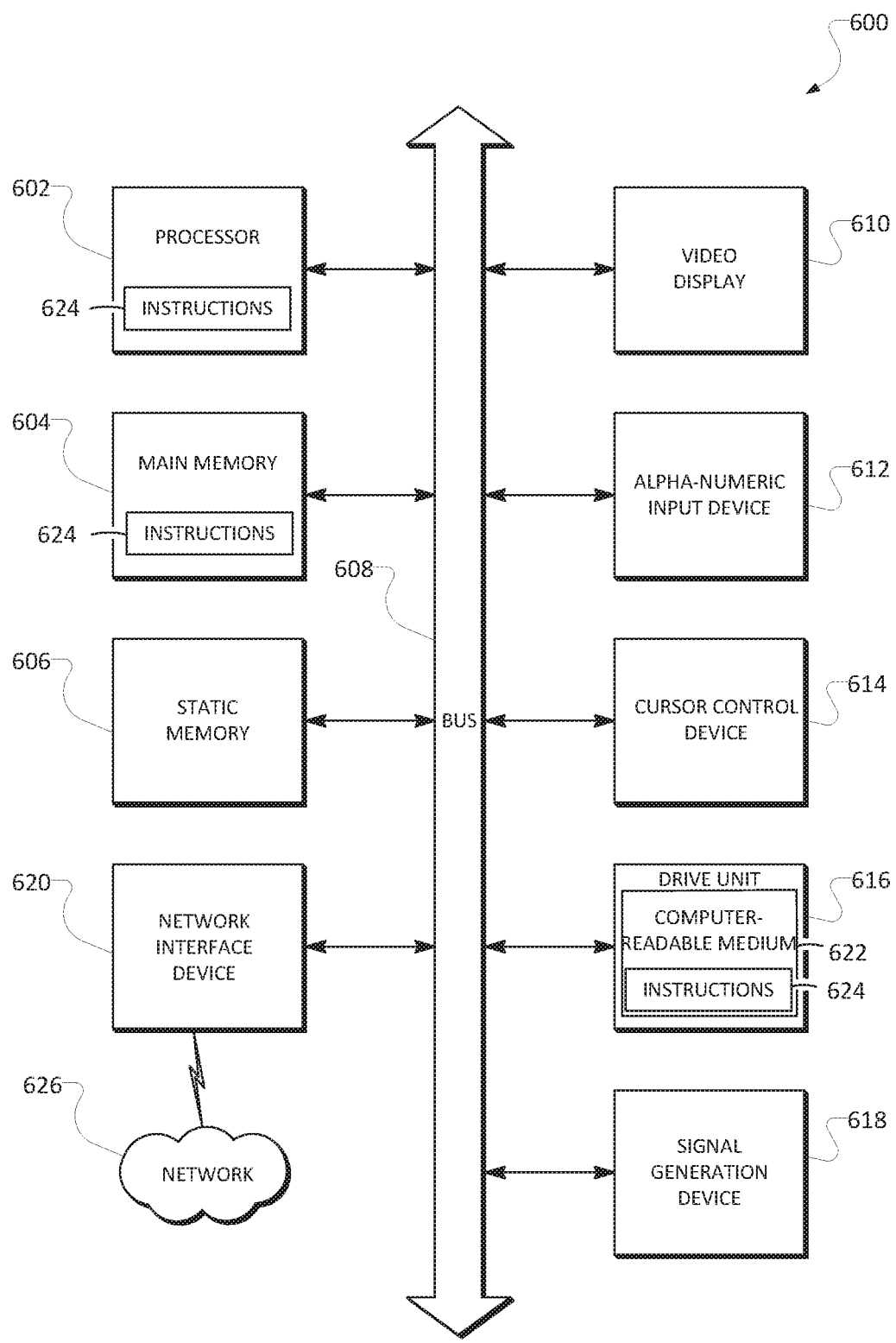
FIG. 6 is a block diagram of a machine in the example form of a computer system within which instructions may be executed for causing the machine to perform any one or more of the methodologies discussed herein.

FIG. 6 is a block diagram of machine in the example form of a computer system 600 within which instructions 624 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard or a touch-sensitive display screen), a user interface (UI) navigation (e.g., cursor control) device 614 (e.g., a mouse), a disk drive unit 616, a signal generation device 618 (e.g., a speaker) and a network interface device 620.

Machine-Readable Medium

The disk drive unit 616 includes a computer-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting computer-readable media 622.

While the computer-readable medium 622 is shown in an example embodiment to be a single medium, the term "computer-readable medium" may include a single medium or multiple media (e.g., a centralized or distributed database, and/or associated caches and servers) that store the one or more instructions 624 or data structures. The term "computer-readable medium" shall also be taken to include any tangible medium that is capable of storing, encoding or carrying instructions 624 for execution by the machine and that cause the machine to perform any one or more of the methodologies of the present disclosure or that is capable of storing, encoding or carrying data structures utilized by or associated with such instructions 624. The term "computer-readable medium" shall accordingly be taken to include, but not be limited to, solid-state memories, and optical and magnetic media. Specific examples of computer-readable media 622 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wifi and WiMax networks). The term "transmission medium" shall be taken to include any intangible medium that is capable of storing, encoding or carrying instructions 624 for execution by the machine, and includes digital or analog communications signals or other intangible media to facilitate communication of such software.

Although the inventive subject matter has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   receiving input from a first user of a computer system;
   creating, by at least one processor, a first text object relating to a first item from the input;
   translating the first text object from a first language to a second language;
   locating, in a database by the at least one processor, a subset of a plurality of text objects in the second language based at least in part on the translation of the first text object from the first language to the second language, wherein the subset of the plurality of text objects in the second language comprise text similar to the translated first text object, each text object of the subset of the plurality of text objects comprising contextual information pertaining to the first item;
   translating, by the at least one processor, at least one of the subset of the plurality of text objects from the second language to the first language;
   causing display, in the first language, of at least one of the subset of the plurality of text objects to the first user; and
   receiving feedback from the first user selecting a second text object in the first language of the subset of the plurality of text objects that indicates that the second text object corresponds to a translation that is representative of the input received from the first user about the first item.

2. The method of claim 1, wherein the translating is performed by a machine translation component.

3. The method of claim 1, wherein the translating is performed by a human.

4. The method of claim 1, wherein the plurality of text objects include objects corresponding to current listings in an ecommerce system and an object corresponding to a past listing in the ecommerce system.

5. The method of claim 1, wherein the translating the first text object to the second language includes passing the first text object to an application program interface (API) for a text translation service.

6. The method of claim 1, wherein the translating the first text object to the second language and the translating at least one of the subset of the plurality of text objects to the first language both utilize a single translation module.

7. The method of claim 1, wherein the input from the first user is a question regarding a product.

8. The method of claim 7, wherein the contextual information includes one or more of the following: a category for the product, past sales information, includes product description information, and one or more images of the product.

9. An apparatus comprising:
   a memory storing a database of a plurality of text objects pertaining to items, the database further including contextual information about the items;
   a translation module executable by a processor and configured to translate a first text object created from input received from a first user about a first item from a first language to a second language;
   a context module configured to locate, in the database, a subset of the plurality of text objects in the second language based at least in part on the translation of the first text object from the first language to the second language, wherein the subset of the plurality of text objects in the second language comprise text similar to the translated first text object;
   the translation module further configured to translate at least one of the subset of the plurality of text objects from the second language to the first language;
   a display module configured to present, in the first language, the translated at least one of the subset of the plurality of text objects; and
   a feedback module configured to receive feedback from the first user selecting a second text object in the first language of the subset of the plurality of text objects that indicates that the second text object corresponds to a translation that is representative of the input received from the first user about the first item.

10. The apparatus of claim 9, wherein the contextual information includes one or more of the following: an item category, past item sales information, item description information, one or more item images, or any combination thereof.

11. The apparatus of claim 9, wherein the feedback includes an explicit selection of the second text object by the first user.

12. The apparatus of claim 9, wherein the feedback includes scores assigned to the subset of the plurality of text objects.

13. The apparatus of claim 9, wherein the context module is further configured to utilize the feedback in future location of text objects.

14. A non-transitory machine-readable storage medium having embodied thereon instructions executable by one or more machines to perform operations comprising:
   receiving, at a user device, input from a first user, the input pertaining to a first item;
   sending instructions to a server, the instructions, when executed by the server, cause the server to:
   create a first text object relating to the first item from the input;
   translate the first text object from a first language to a second language;
   locate, in a database, a subset of a plurality of text objects in the second language based at least in part on the translation of the first text object from the first language to the second language, wherein the subset of the plurality of text objects in the second language comprise text similar to the translated first text object, each text object comprising contextual information pertaining to the first item;
   translate at least one of the subset of the plurality of text objects from the second language to the first language;

send the at least one of the subset of the plurality of text objects to the user device;

cause, at the user device, display, in the first language, of at least one of the subset of the plurality of text objects to the first user; and receive feedback from the first user selecting a second text object in the first language of the subset of the plurality of text objects that indicates that the second text object corresponds to a translation that is representative of the input received from the first user about the first item.

15. The non-transitory machine-readable storage medium of claim 14, wherein the input from the first user is a question regarding a product.

16. The non-transitory machine-readable storage medium of claim 15, wherein the contextual information is a category for the product.

17. The non-transitory machine-readable storage medium of claim 15, wherein the contextual information includes past sales information.

18. The non-transitory machine-readable storage medium of claim 15, wherein the contextual information includes product description information.

19. The non-transitory machine-readable storage medium of claim 15, wherein the contextual information includes one or more images of the product.

20. The non-transitory machine-readable storage medium of claim 15, wherein the translating the text object to the second language and the translating at least one of the plurality of text objects to the first language both utilize a single translation module.

* * * * *